US009604182B2

(12) United States Patent
Leininger

(10) Patent No.: US 9,604,182 B2
(45) Date of Patent: Mar. 28, 2017

(54) SYSTEM FOR TRANSPORTING SOLIDS WITH IMPROVED SOLIDS PACKING

(71) Applicant: General Electric Company, Schenectady, NY (US)

(72) Inventor: Thomas Frederick Leininger, Chino Hills, CA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 356 days.

(21) Appl. No.: 14/106,630

(22) Filed: Dec. 13, 2013

(65) Prior Publication Data

US 2015/0165394 A1 Jun. 18, 2015

(51) Int. Cl.
*B65G 31/04* (2006.01)
*B01F 3/18* (2006.01)
(Continued)

(52) U.S. Cl.
CPC ............ *B01F 3/18* (2013.01); *B01F 11/0094* (2013.01); *B01F 15/0243* (2013.01); *B02C 4/28* (2013.01); *B07B 1/00* (2013.01); *B07B 11/06* (2013.01); *F23G 5/008* (2013.01); *F23K 1/00* (2013.01); *F23K 3/02* (2013.01); *F23G 2201/70* (2013.01); *F23G 2205/20* (2013.01); *F23G 2209/26* (2013.01); *F23K 2201/50* (2013.01); *F23K 2900/05004* (2013.01)

(58) Field of Classification Search
CPC ...................................................... B65G 31/04
USPC ......... 198/642, 723; 406/71, 49, 75; 415/90, 415/126
See application file for complete search history.

(56) References Cited

U.S. PATENT DOCUMENTS 5,051,041 A * 9/1991 Firth ..................... F04D 23/003 198/617
5,103,966 A * 4/1992 Lehmann ............... B65G 47/58 198/549
(Continued)

FOREIGN PATENT DOCUMENTS

EP 0167992 A2 1/1986
EP 1527812 A1 5/2005
GB 581849 A 10/1946

OTHER PUBLICATIONS

European Search Report and Written Opinion issued in connection with corresponding EP Application No. 14197289.3 on Apr. 24, 2015.

*Primary Examiner* — Joseph Dillon, Jr.
(74) *Attorney, Agent, or Firm* — Fletcher Yoder, P.C.

(57) ABSTRACT

A system includes a solid feed pump having a housing, a rotor disposed in the housing, a curved passage disposed between the rotor and the housing, a solid feed inlet coupled to the curved passage, and a solid feed outlet coupled to the curved passage. Also, a solids packing device is coupled to the solid feed inlet of the solid feed pump. The solids packing device includes a first channel configured to receive a solid feed with a first range of sizes, a second channel configured to receive transport assisting particles (TAP) with a second range of sizes. The first range is different from the second range. A third channel is configured to receive and mix the solid feed and the TAP to provide a solid feed-TAP mixture with the TAP filling interspatial spaces between the solid feed. The third channel is coupled to the solid feed inlet.

6 Claims, 9 Drawing Sheets

(51) Int. Cl.

| | |
|---|---|
| ***F23K 1/00*** | (2006.01) |
| ***F23K 3/02*** | (2006.01) |
| ***F23G 5/00*** | (2006.01) |
| ***B01F 11/00*** | (2006.01) |
| ***B01F 15/02*** | (2006.01) |
| ***B02C 4/28*** | (2006.01) |
| ***B07B 1/00*** | (2006.01) |
| ***B07B 11/06*** | (2006.01) |

(56) References Cited

U.S. PATENT DOCUMENTS 5,497,873 A * 3/1996 Hay ........................ B65D 88/66 198/642
5,884,776 A * 3/1999 Piepho ...................... F23K 1/00 110/220
5,934,483 A * 8/1999 Kolacz .................... B07B 7/083 209/713
6,494,151 B1 * 12/2002 Wark ........................ F23K 3/02 110/129
6,832,887 B2 * 12/2004 Baer ...................... B65G 31/04 198/642
7,303,062 B2 * 12/2007 Baer ...................... B65G 31/04 198/642
8,257,451 B2 * 9/2012 Allen ...................... F23N 5/082 44/553
8,887,649 B2 * 11/2014 Russell ................. F04C 13/007 110/101 R
8,920,737 B2 * 12/2014 Leininger ................. C01B 3/16 422/144
8,950,570 B2 * 2/2015 Bielenberg ............... B01J 8/003 198/617
8,951,314 B2 * 2/2015 Leininger ................ C10J 3/506 48/62 R
8,992,641 B2 * 3/2015 Leininger .................. C10J 3/30 48/86 R
9,022,723 B2 5/2015 Leininger
9,109,731 B2 * 8/2015 Pan ......................... F16L 27/12
2010/0024697 A1 2/2010 Allen et al.
2011/0255961 A1 10/2011 Akundy et al.
2012/0085027 A1 * 4/2012 Russell ................... B02C 23/10 48/77
2012/0090977 A1 * 4/2012 Bartek ..................... C10G 1/02 201/2.5
2012/0107060 A1 5/2012 Leininger
2013/0259671 A1 * 10/2013 Leininger ............. G01F 13/001 415/208.1
2014/0030174 A1 1/2014 Leininger
2014/0150288 A1 * 6/2014 Leininger ................. F26B 5/14 34/500
2014/0270993 A1 * 9/2014 Stevenson ................. F02C 3/28 406/14
2015/0204343 A1 7/2015 Leininger

* cited by examiner

SYSTEM FOR TRANSPORTING SOLIDS WITH IMPROVED SOLIDS PACKING

BACKGROUND

The subject matter disclosed herein relates to pressurizing solids pumps.

Various industrial processes include conveying solids from one process to another. Each process may use solids of various sizes, shapes, material consistencies, or other material characteristics. Additionally, each process may use the solids under various temperatures, pressures, humidity levels, or other operational conditions. As a result of different material characteristics and/or operational conditions between processes, it may be difficult to convey the solids from one process to the next.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a solid feed pump that has a housing, a rotor disposed in the housing, a curved passage disposed between the rotor and the housing, a solid feed inlet coupled to the curved passage, and a solid feed outlet coupled to the curved passage. The system also includes a solids packing device coupled to the solid feed inlet of the solid feed pump. The solids packing device includes a first channel configured to receive a solid feed with a first range of sizes, a second channel configured to receive transport assisting particles (TAP) with a second range of sizes. The first range of sizes is different from the second range of sizes. A third channel is configured to receive and mix the solid feed and the TAP to provide a solid feed-TAP mixture with the TAP filling interspatial spaces between the solid feed. The third channel is coupled to the solid feed inlet.

In a second embodiment, a system includes a solids packing device having a first inlet and a second inlet, a solids source configured to provide solids to the first inlet, and an assisting solids source configured to provide assisting solids to the second inlet. The solids have a first range of sizes and the assisting solids have a second range of sizes that is different from the first range of sizes. The system also includes a solids pump configured to receive the solids and the assisting solids from the solids packing device at a first pressure and deliver the solids and the assisting solids to a pressurized end user system at a second pressure.

In a third embodiment, a system includes a solids packing device that has a first inlet and a second inlet, a first source configured to provide solids to the first inlet of the solids packing device, a second source configured to provide assisting solids to the second inlet of the solids packing device, a solids pump configured to receive the solids and the assisting solids from the solids packing device, and a solids separating device configured to receive the solids and the assisting solids from the solids pump, separate the solids from the assisting solids, and output the solids separate from the assisting solids.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is related to systems for pumping a solid feed from a lower pressure section to a higher pressure section, or from higher pressure to lower pressure. The system may utilize a solids pump that has a channel that packs the solid feed with transport assisting solids that block any backflow from the higher pressure section to the lower pressure section. The transport assisting solids may include smaller sized particles of the same material as the solid feed, or the transport assisting solids may be different than the solid feed. The transport assisting solids may be fed into the packing channel through a dedicated channel. The assisting solids and the accompanying assisting solids channel enable the system to maintain a pressure differential for solid feeds that would otherwise allow significant leakage from the higher pressure section to the lower pressure section.

Figure 1:
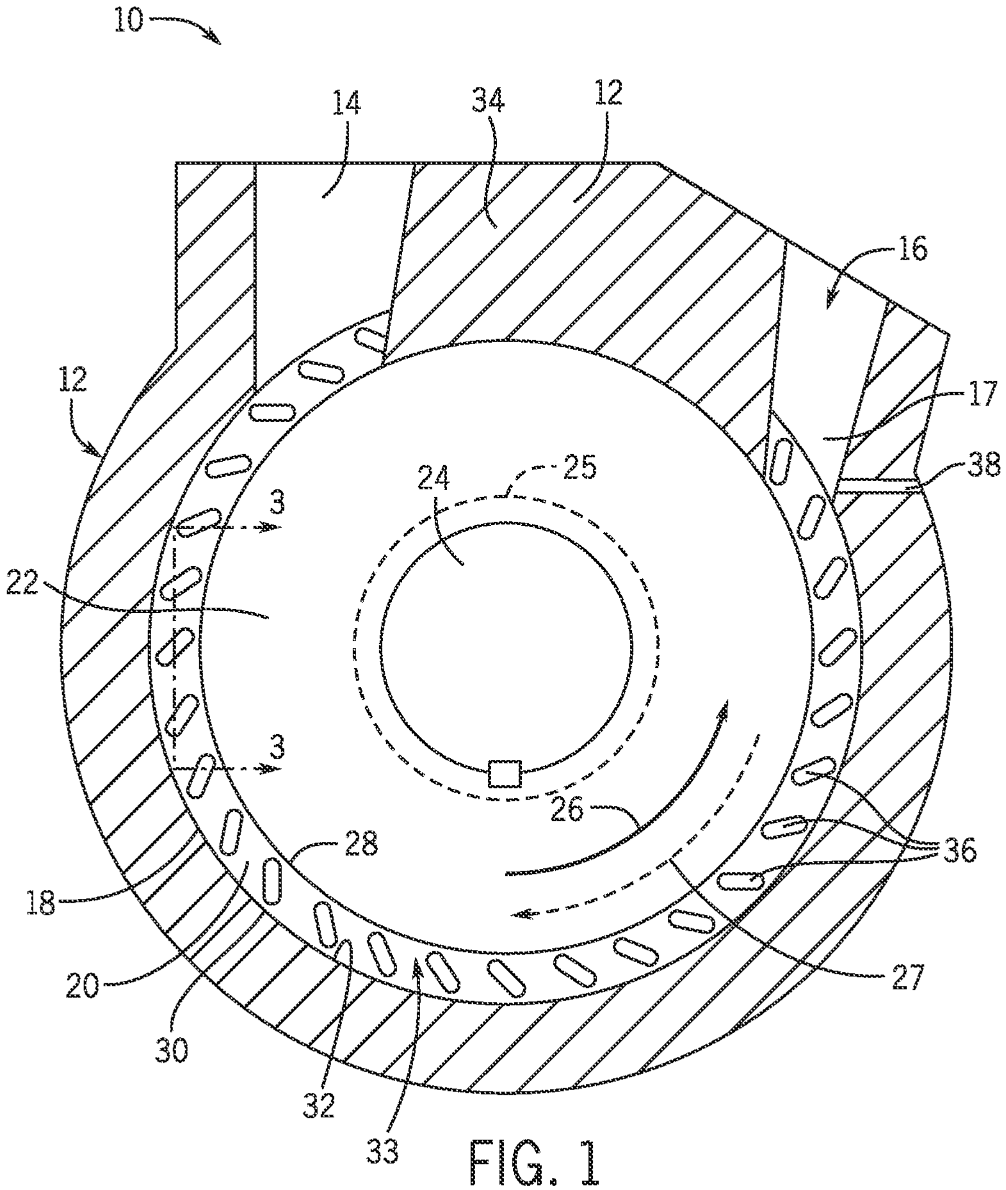
FIG. 1 is a cross-sectional side view of an embodiment of a solids pump that may be used in the systems described below.

FIG. 1 is a cross-sectional side view of an embodiment of a solids pump 10 (e.g., rotary disk type solids pressurizing feeder) that may be used in the systems described below. The rotary disk type solids pressurizing pump 10 may be a Posimetric® Feeder made by General Electric Company of Schenectady, N.Y. As illustrated, the rotary disk type solids pressurizing pump 10 includes a pressure housing (or body) 12, an inlet channel 14 (e.g., a converging inlet channel), an outlet channel 16 (e.g., a diverging outlet channel), and a rotor 18. The rotor 18 may include two substantially opposed and parallel rotary disks 20 separated by a hub 22 and joined to a shaft 24 that is common to the parallel disks 20 and the hub 22. As illustrated, the two disks 20 are not in the plane of the page, as are the rest of the elements in the figure. One of the disks 20 is below the plane of the page, and the other disk 20 is above the plane. The disk 20 below the plane of the page is projected onto the plane of the page in order that it may be seen in relation to the rest of the components comprising the disk type solids pressurizing pump 10. The outer, convex surface 28 of the hub 22, the annularly shaped portion of the two disks 20 that extend between the outer surface of the hub 22 and the peripheral edge 30 of the disks 20, and the inner, concave surface 32 of the feeder housing 12 define an annularly shaped, channel 33 (e.g., curved passage) that connects the converging inlet channel 14 and the diverging outlet channel 16. A portion 34 of the feeder body 12 that is disposed between the inlet channel 14 and the outlet channel 16 divides the channel 33 in such a way that solids entering the inlet channel 14 may travel only in the direction of rotation 26 of the rotor or shaft 24, so that the solids may be carried from the inlet channel 14 to the outlet channel 16 by the rotating annularly shaped channel 33 defined by the rotating outer surface of the hub 22, the rotating exposed annular surfaces of the disks 20, and the stationary inner surface 32 of the body 12.

As solids enter and move downwards through the converging inlet channel 14, the particles progressively compact. As the particles continue to be drawn downwards and into the rotating channel 33, the compaction may reach a point where the particles become interlocked and form a bridge across the entire cross-section of the channel 33. As the compacted particles continue to move through the rotating channel 33 in the direction of rotation 26, the length of the zone containing particles which have formed an interlocking bridge across the entire cross-section of the rotating channel 33 may become long enough that the force required to dislodge the bridged particulates from the channel 33 exceeds the force that can be generated by a high pressure environment at the outlet of the pump 10. This condition, where the interlocking solids within the channel 33 cannot be dislodged by the high pressure at the outlet of the pump 10, is referred to as "lockup." By achieving the condition of lockup, the torque delivered by the shaft 24 from a drive motor 25 may be transferred to the rotating solids so that the solids are driven from the inlet channel 14 to the outlet channel 16 against pressure in the high-pressure environment beyond the exit of the outlet channel 16. In some embodiments, the rotor disks 20 may have raised or depressed surface features 36 formed onto their surfaces. These features may enhance the ability of the particulate solids to achieve lockup in the channel 33 and, therefore, may also enhance the ability of the drive shaft 24 to transfer torque to the rotating solids.

As the particles move through the diverging outlet channel 16, the forces that held them in the lockup condition begin to relax to the point where, at the downstream exit of the outlet channel 16, the particles are gradually able to freely disengage from the outlet channel 16 and proceed downstream. However, at the diverging outlet channel 16, the solids may be subjected to the upstream force of the constantly advancing solids that are locked up and being driven forward by the rotor 18 and the downstream force of the high-pressure environment into which the solids are being transported. Under these compressive forces, from both upstream and downstream, the solids in an upstream portion 17 (e.g., inlet) of the outlet channel 16 may compact even further and may form a dynamic, packed bed (e.g., a dynamic seal) that is highly resistant to the backflow of fluids (e.g., gases or liquids) from the high-pressure environment at the discharge of the pump 10. It is this zone of highly packed, flow resistant particulate solids that may block any significant backflow of fluids (e.g., process gases or liquids) from the outlet channel 16 (e.g., high pressure outlet) to the inlet channel 14 (e.g., low pressure inlet) of the pump 10. This highly packed, flow resistant zone of solids may form an imperfect seal, and some fluid may leak backwards through the tightly packed solids at the upstream inlet 17 of the outlet channel 16. However, the amount of backflow may be small, and the small amount of fluid that may work its way through the tightly packed solids may be released through a vent 38 and, thus, blocked from flowing backwards all the way through the channel 33 to the inlet channel 14. The small amount of fluid (gases or liquids) that may be collected in the vent 38 may either be disposed of or recycled to an appropriate location elsewhere in the process. As a result of the dynamic packed bed at the inlet 17 of the outlet channel 16 that is highly resistive to fluid backflow, and by venting the small amount of fluid which may work its way back through the dynamic packed bed of solids, the rotary disk type solids pressurizing pump 10 may function to separate two processes having differing pressures and/or differing chemical compositions.

The operation of the rotary disk type solids pressurizing pump 10 shown in FIG. 1 was explained above for an embodiment in which the rotation of the annularly shaped channel 33 was from the inlet channel 14, which is at lower pressure, to the outlet channel 16, which is at higher pressure. This mode of operation of the pump 10 may be referred to as a "pressurizing mode." However, the rotation of the disks 20, and hence of the annularly shaped channel 33, may be reversed so that the direction of rotation 27 runs from the higher-pressure outlet channel 16 to the lower pressure inlet channel 14. In this reversed direction of rotation 27, the rotating disk type solids pressurizing pump 10 operates as a solids depressurizing feeder, e.g., in a "depressurizing mode." When operating in the depressurizing mode, the solid particulates from a high-pressure zone enter the channel 16 (e.g., functioning as an inlet channel rather than an outlet channel. Depressurizing feeders may also employ shapes that are different than for the inlets/outlets as well as the channel. For example, the inlets for the depressurizing feeder may have larger or smaller channels. In other words, the depressurizing feeders may be the same feeders as the pressurizing feeders, simply running in reverse. Or the depressurizing feeders may be specifically designed for depressurization.

As the solids progress downwards through the channel 16, the solids move through the dynamic, highly compacted zone at the bottom of the channel 16 that forms the highly back flow resistant zone that prevents unwanted backflow from the high-pressure region at the outlet channel 16 to the low-pressure region at the channel 14. As the annularly shaped channel 33 continues to rotate in the reversed direction 27, the solids are carried back to the channel 14 where the locking forces that held them in place inside the rotating channel relax and allow the solids to disengage from one another as they exit the inlet channel 14 on the low pressure side of the pump 10. In certain embodiments, a lower pressure reactor vessel is coupled together with a higher pressure reactor vessel, and at least one solids pressurizing feeder 16 operating in pressurizing mode and one solids pressurizing pump 10 operating in depressurizing mode may be used to transport solids between the vessels and/or other equipment. In embodiments with two vessels operating at essentially the same pressure, one, two, or more solids pressurizing feeders 10 may both operate in the pressurizing mode.

Figure 2:
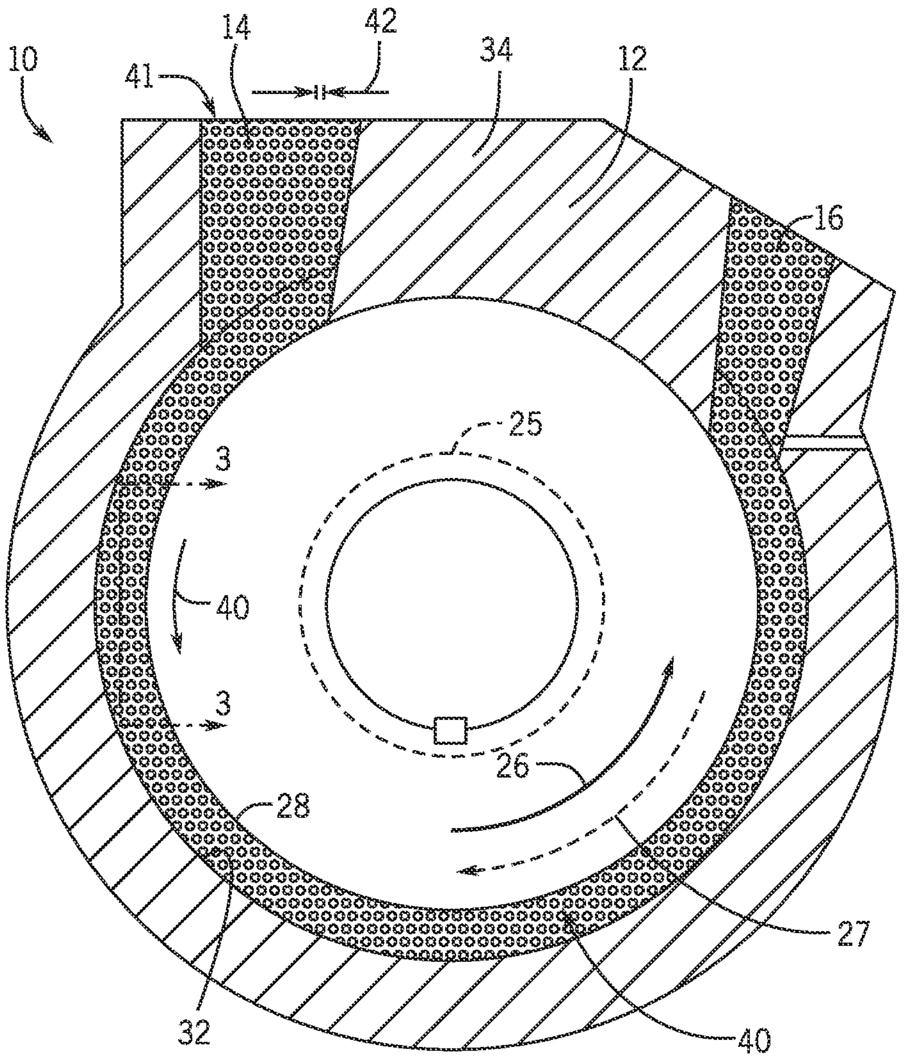
FIG. 2 illustrates the solids pump of FIG. 1 with an inlet channel, a solids transport channel, and an outlet channel filled with finely ground solids.

FIG. 2 shows the solids pump 10 illustrated in FIG. 1 with the inlet channel 14, solids transport channel 33 (i.e., the channel defined by the convex surface 28 and the concave surface 32), and outlet channel 16 transporting a solids flow 40 of a finely divided transport assisting solids 41 (e.g., sand, ground biomass, coal fines, petroleum coke fines, pulverized limestone, ground glass, small flexible polymer beads, crumb rubber, and the like or any combination thereof). The transport assisting solids 41 are solids that have been pulverized, ground, crushed, manufactured, formed and/or treated in some way so that each particle is defined by a particle diameter 42. The particle diameter 42 may be defined by a maximum value for each particle or the transport assisting solids 41 may be defined by a certain proportion being smaller than a maximum value. By further example, the transport assisting solids 41 may all be smaller than approximately 30-50 Mesh (i.e., 0.599-0.297 μm). For example, the transport assisting solids 41 may include material in which 60, 70, 80, or 90 percent of the particles are smaller than approximately 100 Mesh (i.e., 0.152 μm). The small diameter (relative to the size of the channel 33) particles illustrated in FIG. 2 represent the various particles and depict that the particles 40 are capable of forming a tightly packed column within the pump 10 that is capable of sustaining the high pressure drop between the high pressure zone at the outlet channel 16 and the low pressure zone at the inlet channel 14.

Figure 3:
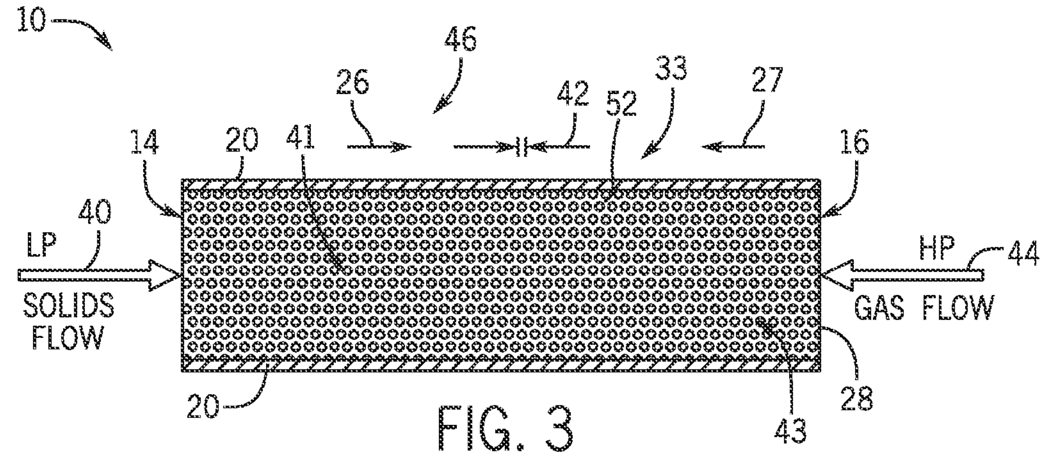
FIG. 3 illustrates a simplified schematic of an embodiment of the solids transport channel filled with the finely ground solids between the inlet channel and the outlet channel of the solids pump shown in FIGS. 1 and 2 taken along line 3-3.

FIG. 3 is a schematic of a simplified representation of an embodiment of a section 46 of the curved solids transport channel 33 between the inlet channel 14 and the outlet channel 16 of the solids pump 10 shown in FIGS. 1 and 2, illustrating a solids flow 40 of relatively fine particulate solids 41 moving through the pump 10. As illustrated, the solids flow 40 (e.g., low pressure fire particulate solids 41) moves through the channel 33 in a downstream direction 26 (e.g., from left to right) under the influence of the opposite rotating disks 20 inside the pump 10. As discussed below, the fine particulate solids 41 are relatively closely packed together to help block fluid flow, such as gas or liquid flow. For example, the fine particulate solids 41 with tight packing can resist a gas flow 44 (e.g., high pressure gas flow 44) flowing in an upstream direction 27 (e.g., from right to left), from the high pressure zone at the outlet channel 16 to the low pressure zone at the inlet channel 14. The finely ground solids 40 have a particle size 42 distribution that is conducive to forming tightly packed solids in the pump 10, such as in the channel 33 and the outlet channel 16. The distribution of the particle size 42 may include a broad range of particle sizes in order to achieve tight packing, or the particle size 42 in some embodiments may have a narrow size distribution. However, the particle size 42 of the solids 41 may be relatively small. In these cases, open space or voids between the solids 41 is limited in size. Due to the small spaces between the solids 40, the high pressure gas 44 has a difficult time flowing from right to left. That is, pathways 52 for gas flow 44 from the outlet channel 16 to the inlet channel 14 are few and small. Therefore, a high pressure drop is sustained between the outlet channel 16 and the inlet channel 14.

Figure 4:
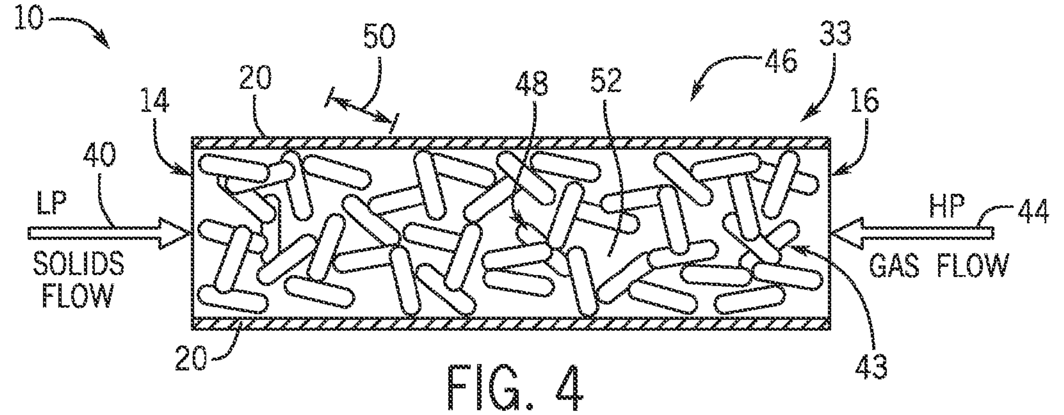
FIG. 4 is a simplified schematic of an embodiment of the solids transport channel of FIG. 3 filled with large solid particles.

FIG. 4 is a schematic of the section 46 of the curved solids transport channel 33 filled with large solid particles 48 (e.g., coarse particulate solids), which may have a narrow particle size 50 distribution (i.e., relative to the tightly packed fine solids 41 in FIG. 3). A narrow size distribution means that for example, due to the limited range of particle sizes (there are no small particles to fill in the gaps), or the random and irregular shapes of the particles, the particles do a poor job of packing and the resulting poorly packed solids offer little resistance to gas flow from outlet channel 16 to inlet channel 14. Pathways (i.e., spaces, voids, or gaps 52) for gas flow are many and large. Consequently, it may be difficult to transport these solids 48 against a high pressure drop. In certain embodiments, it may be desirable to use coarse particulate solids 48 in a high pressure downstream system.

Figure 5:
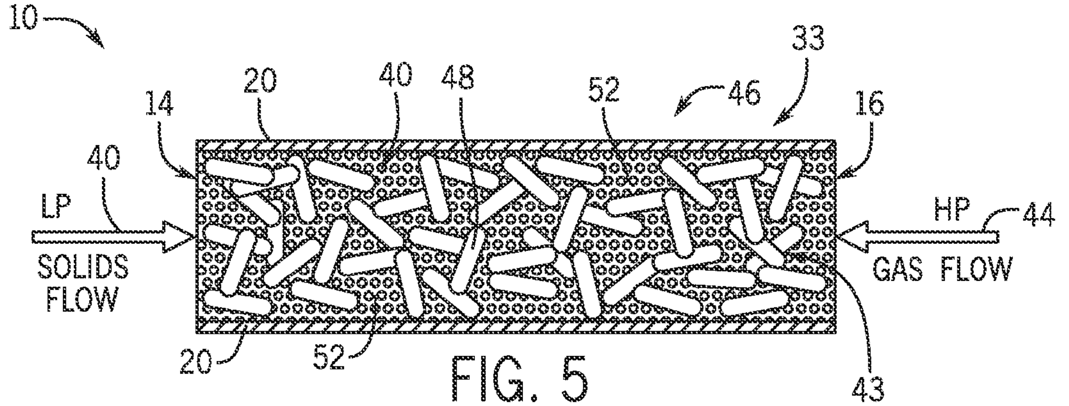
FIG. 5 is a simplified schematic of an embodiment of the solids transport channel of FIG. 3 filled with the large solid particles and the finely ground solids of FIGS. 3 and 4.

FIG. 5 is a schematic of the section 46 of the curved solids transport channel 33 of FIGS. 3 and 4, illustrating transport of a solids mixture of the large solid particles 48 (e.g., of FIG. 4) and the finely ground solids 41 (e.g., of FIGS. 2 and 3). The small, tightly-packing solids 41 are able to fill all the spaces between the large solids particle 48. Therefore, the pathways 52 for gas flow 44 are few and small. As with the embodiment of the pump 10 shown in FIG. 3, the tight packing of the solids flow 40 achieved by the fine particulate solids 41, which also fill the gaps 52 associated with the coarse particulate solids 48, enables the pump 10 to maintain a high pressure drop between the outlet channel 16 and the inlet channel 14. Thus, both the small particles (e.g., transport assisting solids 41) and the large particles (e.g., solid feed 48) can be transported by the pump 10 against a high pressure gas 44. The assisting solids 41 may be made from a broad range of suitable materials. For example, a solids packing device 64 (see FIG. 6) may use an attrition resistant material that is different from the solid feed 48 material. These materials are used in transport assisting solids recycle embodiments as explained in detail below. The assisting solids 41 may also include the same material as the solid feed 48. That is, a portion of the solid feed 48 may be pulverized to obtain a particle size distribution that is more efficient at packing the solids flow 40. The assisting solids 41 may also be made from polymer or rubber balls or beads that are flexible, resilient and compressible and that can deform around and cushion the large solids (particularly fragile chunk solids) as they pass through the solids pump 10. The assisting solids 41 may also be made from a material (e.g. fluxant, additive, reactant) that is a desired participant in the downstream processing of the chunk solids 48. Either all or just a portion of these types of transport assisting solids 41 stay with the pressurized chunks 48 that are fed into the end user process.

Figure 6:
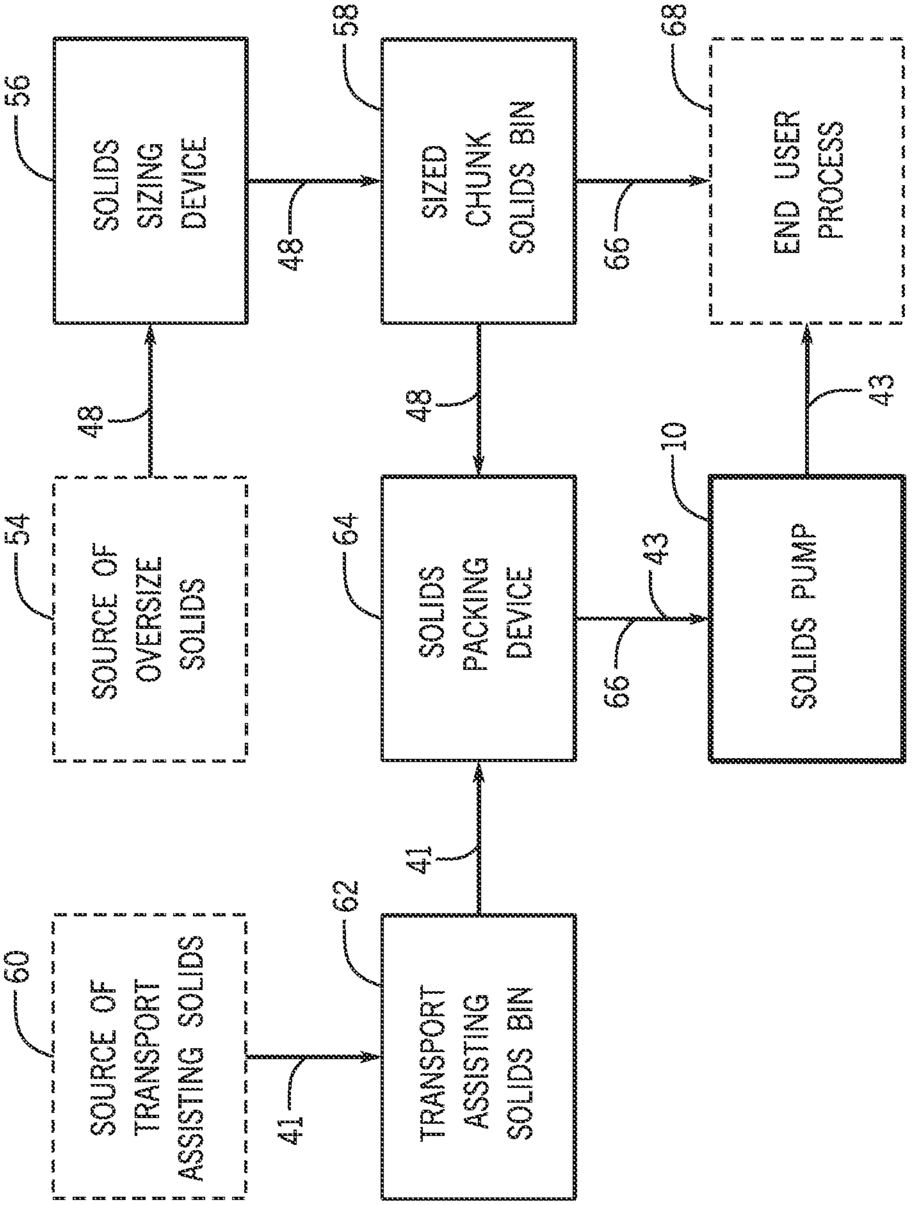
FIG. 6 is a block diagram of an embodiment of a system that prepares a solids mixture and pumps the solids mixture with the solids pump of FIGS. 1-5.

FIG. 6 shows a block flow diagram for one embodiment of a system that employs the concept illustrated in FIG. 5. Solids 48 from a source of oversize solids 54 pass through a solids sizing device 56, such as a grinder or crusher, in order to produce size-reduced solids 48 which are sized small enough to pass through the solids pump 10. The source of oversize solids 54 may be a hopper or bin that stores the solids 48, or may be a conveyor that constantly conveys the solids 48 to the solids sizing device 56. The source of oversize solids 54 may also have other structural components. If the oversized solids 48 are already small enough to pass through the pump 10, the size reduction step may be eliminated. The size-reduced solids 48 are stored in a sized chunk solids bin 58 for further use. Note that, in the descriptions that follow, the terms sized chunks, chunks and chunk solids refer to solids that are characterized by a narrow particle size distribution with relative little or no smaller size particles available to fill in the gaps 52 between the larger ones (e.g., the solids 48 shown in FIG. 4). In parallel with the oversize solids 48 sizing and storage steps, solids 41 (e.g., relatively fine particulate solids 41) from a source of transport assisting solids 60 are loaded into a transport assisting solids bin 62 for further use. These solids 41 are capable of forming a tightly packed column, because they include a wide range of particle sizes 42, including fine and very fine particles that are able to fill in essentially all of the gaps 52 between all larger particles 48. Following the chunk solids and transport assisting solids storage steps, chunk solids 48 and transport assisting solids 41 are combined or mixed in a solids packing device 64. The solids packing device 64 may be located immediately upstream of the inlet channel 14 and is configured to completely surround the solid feed 48 with the finer transport assisting solids 41 so that all of the gaps 52 between the solid feed 48 that would otherwise be left open are now filled with transport assisting solids 41. The combination 66 (e.g., solids mixture 43) of chunk 48 and transport assisting solids 41 then enters the solids pump 10 that meters and pressurizes the combination 66 into an end user process 68 such as a gasifier, a reactor, a furnace, a boiler, a combustor, a high pressure treating process, or any combination thereof.

Figure 7:
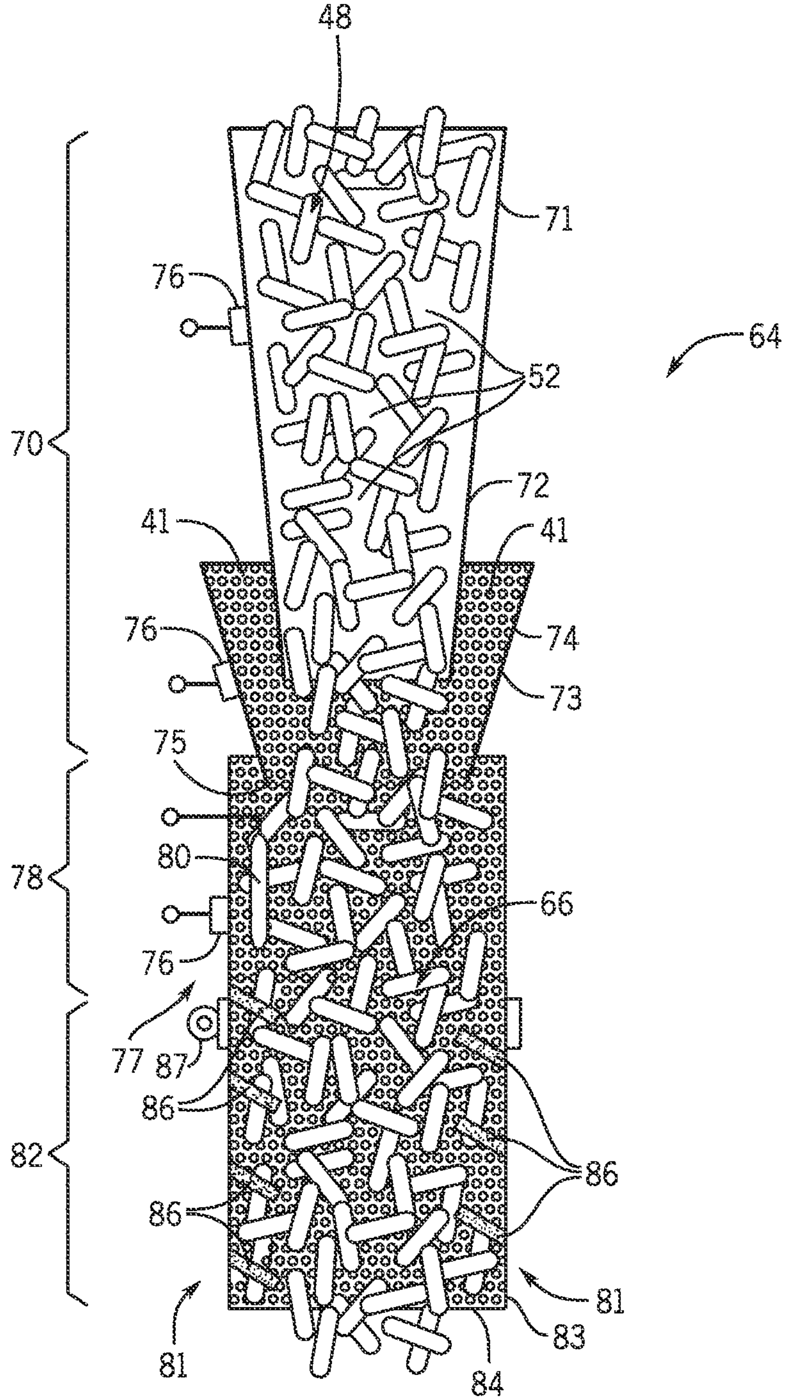
FIG. 7 is a schematic of an embodiment of a solids packing device that prepares the solids mixture for the system of FIG. 6.

FIG. 7 is a schematic of an embodiment of the solids packing device 64 of FIG. 6. A top portion 70 of the device 64 includes two concentric solids delivery nozzles 72, 74. The center nozzle 72 introduces the sized solid feed 48 into a central portion of the solids packing device 64, and the outer nozzle 74 introduces the transport assisting solids 41 into the device 64 around the outside of the solid feed 48. Both nozzles (i.e., center nozzle 72 and outer nozzle 74) have inwardly tapered or converging walls 71 and 73, and external vibrators 76 disposed on an outer surface to improve flow of solids 40 (e.g., solid feed 48 and assisting solids 41) into and through the device 64. The center nozzle 72 may be either flush with or retracted from the exit orifice 75 of the outer nozzle 74. As illustrated, the center nozzle 72 is retracted (e.g., axially offset) from an exit orifice 75 of the outer nozzle 74. A middle portion 78 of the solids packing device 64 includes a vibrating packing column that ensures that the solid feed 48 and the transport assisting solids 41 are well mixed and well packed (e.g., a column 77 ensures that all the gaps 52 between the solid feed 48 are completely filled with the transport assisting solids 41). Both the external vibrator 76 and one or more internal vibrators 80 disposed within a flow path of the solids 48 and transport assisting solids 41 are provided to ensure that thorough mixing and packing of the two solids 41, 48 streams occurs. Other embodiments may include only one vibrator (76 or 80), and still other embodiments may include no vibrators, or additional vibrators within and external to the device 64. A bottom portion 82 of the solids packing device 64 includes a live wall column 81 that actively transports the packed solids mixture 66 into the inlet channel 14 of the solids pump 10 attached immediately below an exit 84 of the device 64. The live wall column 81 of the bottom portion 82 has a rotating channel 83 with internal spiral flutes 86 that act as a screw conveyor that actively moves the mixed solids stream 66 (e.g., solids mixture 43) downwards through the channel 83. The rotating channel 83 is driven by a gear, such as an external worm gear 87.

In certain applications of the equipment configuration of FIG. 7, the solid feed 48 may include a material that is somewhat fragile. Fragile materials 48 may be damaged by the solids pump 10, because of the high compressive and frictional forces that develop within portions of the pump 10. In order to minimize damage to fragile solid feed 48, the transport assisting solids 41 may include small, flexible polymer or rubber beads. The beads 41 that are added to the device 64 include shapes and a particle size distribution that facilitates efficient packing with the solid feed 48 being fed through the device 64. When the solids packing device 64 mixes the flexible, compressible beads 41 with the large, fragile solid feed 48, the solid feed 48 are surrounded by the beads 41 and all the gaps 52 (e.g., void spaces) in the combination 66 are filled with the beads 41. As the combination 66 (e.g., solids mixture 43) moves through the solids pump 10, the flexible, compressible beads 41 not only provide the tight packing to sustain a pressure drop across the pump 10, but the beads 41 also cushion the fragile solid feed 48, thereby reducing the possibility that the chuck solids 48 may be damaged during their passage through the solids pump 10.

Figure 8:
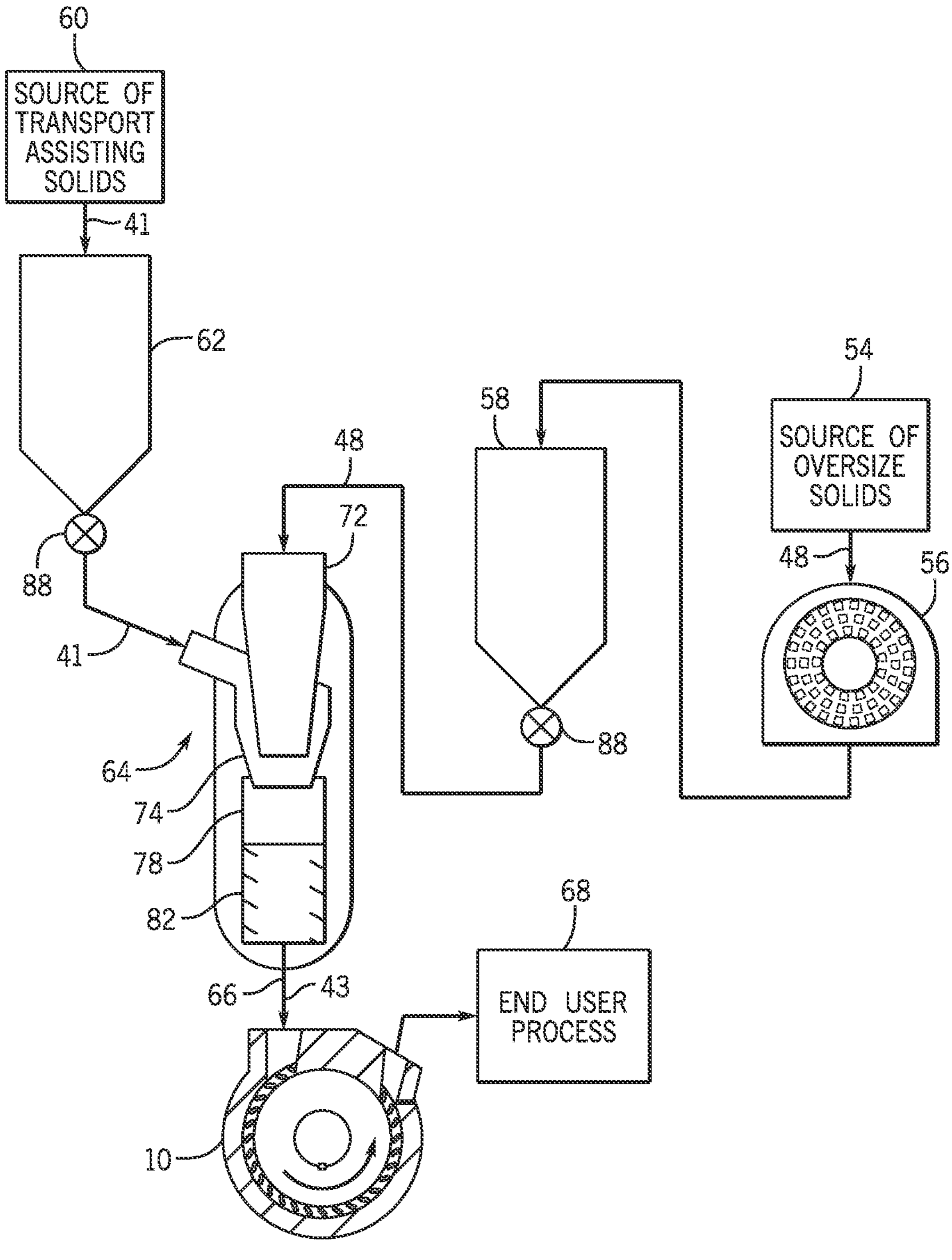
FIG. 8 is a schematic of an embodiment of an equipment configuration of the system shown in FIG. 6.

FIG. 8 is a schematic of an embodiment of an equipment configuration for the process embodiment shown in FIG. 6. A source of oversize solids 54, passes the solids 48 (e.g., coal, petroleum coke, limestone, ore, wood, biomass, carbon-containing waste materials or any combination thereof) through a grinder 56 that reduces the solids to chunks that can effectively pass through the solids pump 10 (e.g., without jamming). The grinder 56 may be any suitable grinder that produces solids with the desired particle size. The grinder 56 may also size a portion of the oversize solids 54 into transport assisting solids 60. The solid feed 48 (e.g., coal) is then stored in a sized chunk solids bin or hopper 58. A source of transport assisting solids 60, such as pulverized coal 41 (e.g., possibly prepared from the same source), is loaded into the transport assisting solids bin or hopper 62. The transport assisting solids bin or hopper 62 may be of any suitable construction that is compatible with the transport assisting solids 41 which it stores for use within the solids packing device 64. The bin or hopper 62 may also be a conveyor belt, tube, or pump that constantly conveys the solids 41 to the solids packing device 64. The source of oversize solids 54 may also have other structural components. The bottoms of both the transport assisting solids bin 62 and the sized chunk solids bin 58 may be fitted with rotating star valves 88 or other similar devices that meter the two solids 41, 48 into the solids packing device 64. The two star valves 88 may be controlled by a controller so as to feed the assisting solids 41 and the solid feed 48 into the solids packing device 64 at a ratio that achieves efficient packing. The solids packing device 64 mixes and packs the two solids (i.e., solid feed 48, such as chunk coal, and assisting solids 41, such as pulverized coal) together and then feeds the combination 66 into the inlet channel 14 of the solids pump 10. The solids pump 10 simultaneously pressurizes and meters the combination 66 of pulverized and chunk coal 43 into a downstream end user process 68 (e.g. a pressurized fluidized bed combustor, reactor, or gasifier).

In an alternative application of the equipment configuration of FIG. 8, other materials may be substituted for the pulverized coal that was used as the transport assisting solids in the first example. For example, limestone may be used as a sulfur sorbent in coal combustion applications, and the use of pulverized limestone as the transport assisting solids 41 in the equipment configuration of FIG. 8 provides a convenient way to co-feed coal and sulfur sorbent into a pressurized fluidized bed combustor, reactor, or gasifier.

In a further alternative application of the equipment configuration of FIG. 8, the source of solid feed 48 may be wood, wood waste or some other oversize biomass material; and the transport assisting solids 41 may be sawdust or similar finely divided biomass from a biomass processing facility. In this biomass application, the solids packing device 64 mixes and packs the sized wood or biomass chunks 48 with the sawdust or finely divided biomass 41 and then feeds the combined biomass stream 43, 66 to the solids pump 10. The solids pump 10, in turn, pressurizes and meters the combined biomass stream 43 into the downstream end user process 68, such as a fluidized bed biomass gasifier or a steam-biomass reformer. A biomass feeding process may significantly improve the efficiency and economics of many biomass conversion processes. Many state-of-the-art biomass conversion processes are currently limited to relatively low pressure operation, because of the difficulty of pressurizing biomass feedstocks, many of which are available in sizes and particle size distributions that do not pack well. As a consequence, most biomass conversion processes must compress the product bio-syngas downstream of the biomass reactor in order to obtain high enough pressure for further processing, such as converting the bio-syngas to biomass-derived liquid fuels and chemicals or combusting the bio-syngas in a combustion turbine to generate electrical power. By using the biomass feeding process of FIG. 8, the biomass reactor can be operated at pressure that is higher than the pressures used by all downstream processes and, therefore, the intermediate compressor can be eliminated.

Note that, in FIG. 8, one or more pieces of equipment may be added, substituted or subtracted within the scope of the embodiment in the block flow diagram of FIG. 6. For example, if the oversize solids 48 are already available at a size that are unlikely to jam in the solids pump 10, the grinder 56 may be eliminated. Although the solids pump 10 is shown as discharging directly into the end user process 68, the solids pump 10 may discharge to a screw conveyor, a pneumatic conveying system, or another process or device that does the final feeding to the end user process 68.

Figure 9:
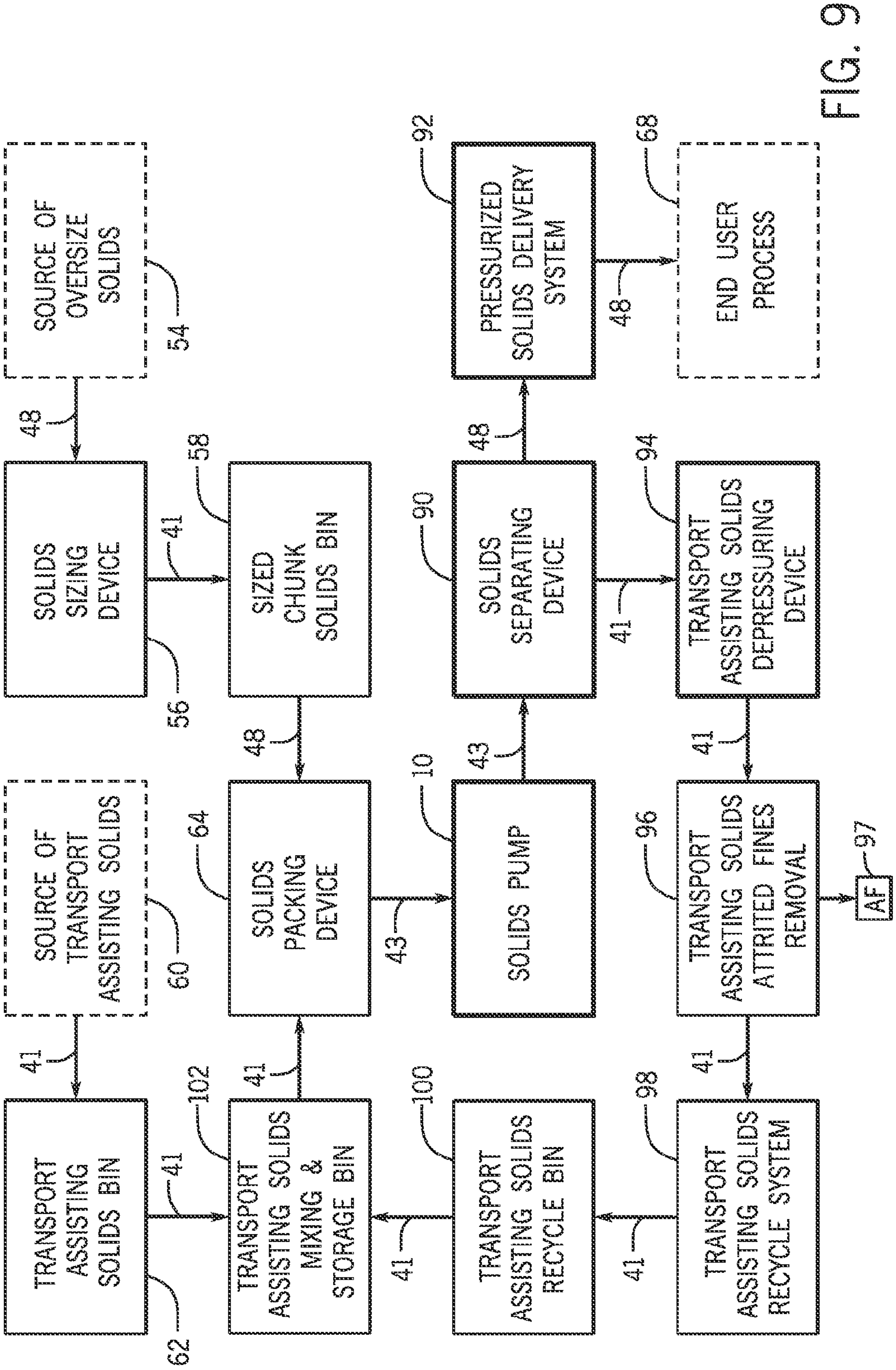
FIG. 9 is a block diagram of an embodiment of a system for mixing, pumping, and separating fine and coarse particulate solids.

FIG. 9 illustrates an embodiment for delivering the combination 66 of solid feed 48 and assisting solids 41 to the end user process 68. In FIG. 9, the transport assisting solids bin 62, the solids sizing device 56, the sized chunk solids bin 58, the solids packing device 64 and the solids pump 10 generally have the same features and functions as described in the block flow diagram of FIG. 6. Additionally, the embodiment of FIG. 9 is configured for situations in which the transport assisting solids 41 are not used by the end user process 68 along with the pressurized chunk solids. To avoid delivering the assisting solids 41 to the end user process 68, a solids separating device 90 may be placed downstream of the solids pump 10 to separate the transport assisting solids 41 from the solid feed 48 before the solid feed 48 is delivered to the end user process 68 by a pressurized solids delivery system 92. The transport assisting solids 41 that were separated by the solids separating device 90 are recycled back to the front end of the process in a recycle loop that begins with a transport assisting solids depressurizing device 94. After the transport assisting solids 41 have been depressurized by device 94, the solids 41 are sent through a transport assisting solids attrited fines removal 96 where at least some of the attrited fines 97 are removed in order to prevent very fine material from accumulating within the transport assisted solids recycle loop. The non-attrited fines fraction of the transport assisting solids 41 is then moved via a recycle system 98 to a transport assisting solids recycle bin 100 that provides buffer storage in the recycle system. Recycled transfer assisting solids 41 are mixed with fresh transfer assisting solids and stored in a transport assisting solids 41 mixing and storage bin 102 upstream of the solids packing device 64. Mixed transport assisting solids 41 from the mixing and storage bin 102 are metered into the solids packing device 64 along with the sized solid feed 48 to complete the cycle.

Figure 10:
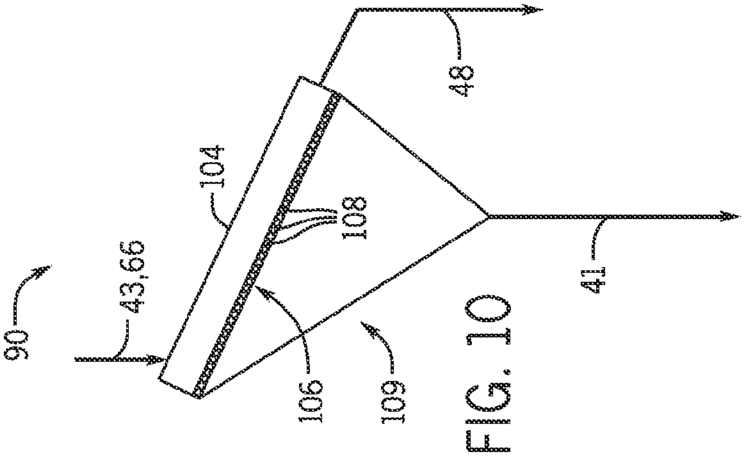

FIG. 10 illustrates a cross-section of an embodiment of the solids separating device 90 that can be used for the solids separation step downstream of the solids pump 10. A first example 104 is a simple, pressurized vibrating screen 106 with openings 108 that are small enough to block the solid feed 48 from passing through but large enough to allow the transport assisting solids 41 to pass. The separating device 90 may also include a tapered collection portion 109 that aggregates the transport assisting solids 41. Aggregation by the tapered collection portion 109 of the transport assisting solids 41 may reduce losses that would otherwise result from the fine particulates in the transport assisting solids 41 floating away due to agitation.

Figure 11:
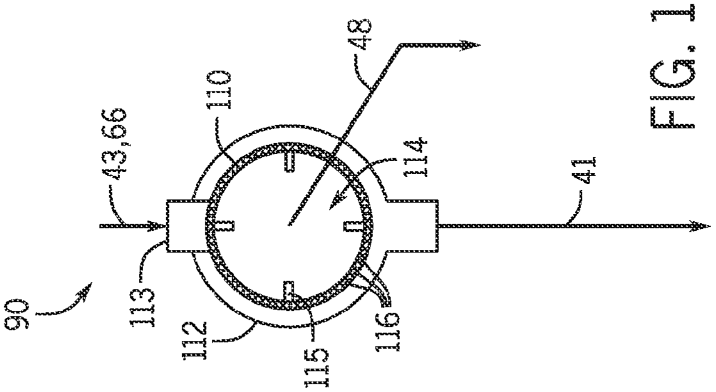

FIG. 11 illustrates a cross-section of an embodiment of the solids separating device 90. The solids separating device 90 of FIG. 11 is a rotating cylindrical tumbler screen 110 inside a cylindrical pressure housing 112 that collects the separated transport assisting solids 41. The packed solids combination 66 from the discharge of the solids pump 10 is fed into the rotating screen 110, which is oriented with a slight downward slope from inlet 113 to outlet 114. As the screen 110 rotates, internal baffles 115 tumble the solids (e.g., the combination 66, solid feed 48, and/or assisting solids 41). The transport assisting solids 41 pass through small holes 116 in the screen 110, while the larger solid feed 48 are retained inside the screen 110 and, after progressing along the length of the downwardly sloping rotating screen 110, leave the solids separation device via exit 114 to the end user process 68.

Figure 12:
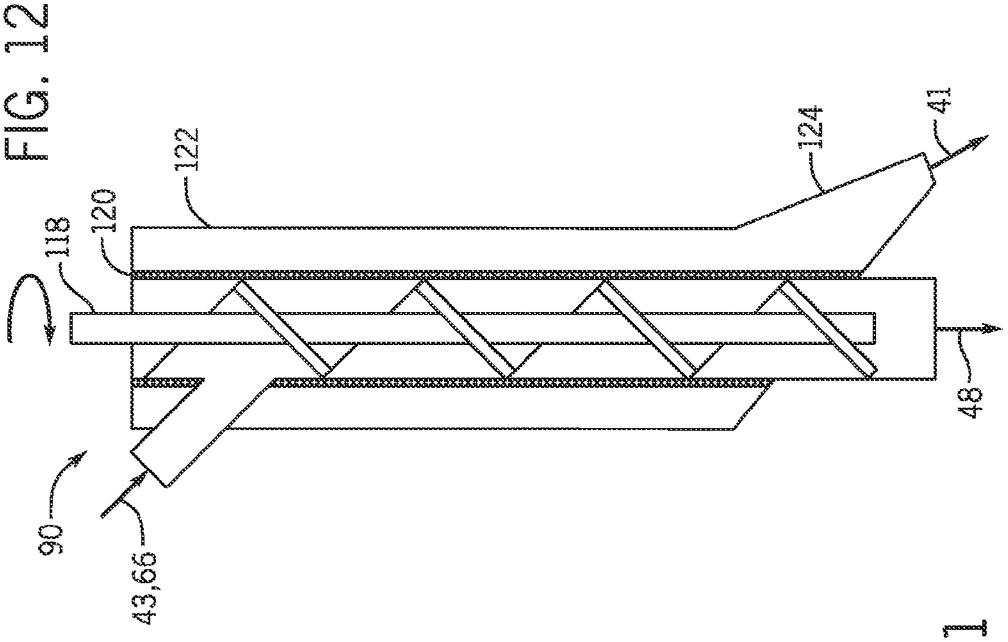
FIGS. 10-12 are schematics of embodiments of a solids separating device that can be used for separating solids downstream of the solids pump in the system of FIG. 9.

FIG. 12 illustrates a cross-section of an embodiment of the solids separating device 90. The solids separating device 90 of FIG. 12 includes a vertical rotating screw conveyor 118 inside a tubular screen 120 fixed inside a pressurized cylindrical barrel 122 that collects the separated transport assisting solids 41. The packed solids combination 66 exits from the solids pump outlet channel 16 toward the angled inlet that intersects one side of the top of the tubular screen 120 and the solids (e.g., the combination 66, solid feed 48, and/or assisting solids 41) are transported downwards by the rotation of the screw 118. As the screw 118 rotates, the finer transport assisting solids 41 pass through the small holes in the fixed tubular screen 120, collect in the outer barrel 122, and exit via a nozzle 124 at the bottom. The larger solid feed 48 remains on the screw 118 and exits the separating device at the bottom of the screw 118. In certain embodiments, the solids separating device 90 is reversed so that the combined, packed solids combination 66 enters the bottom of the screw 118 and flows upward. Thus, the rotating screw 118 would discharge the large chunks 48 at the top, while the separated transport assisting solids 41 would still exit via the nozzle

124 at the bottom of the barrel 122. Although FIGS. 10, 11, and 12 illustrate three possible examples of solids separation devices 90, the disclosed systems and methods may use any other solids separating devices 90 alone or in combination with any or all of the devices 90 depicted in FIGS. 10, 11, and 12.

Figure 13:
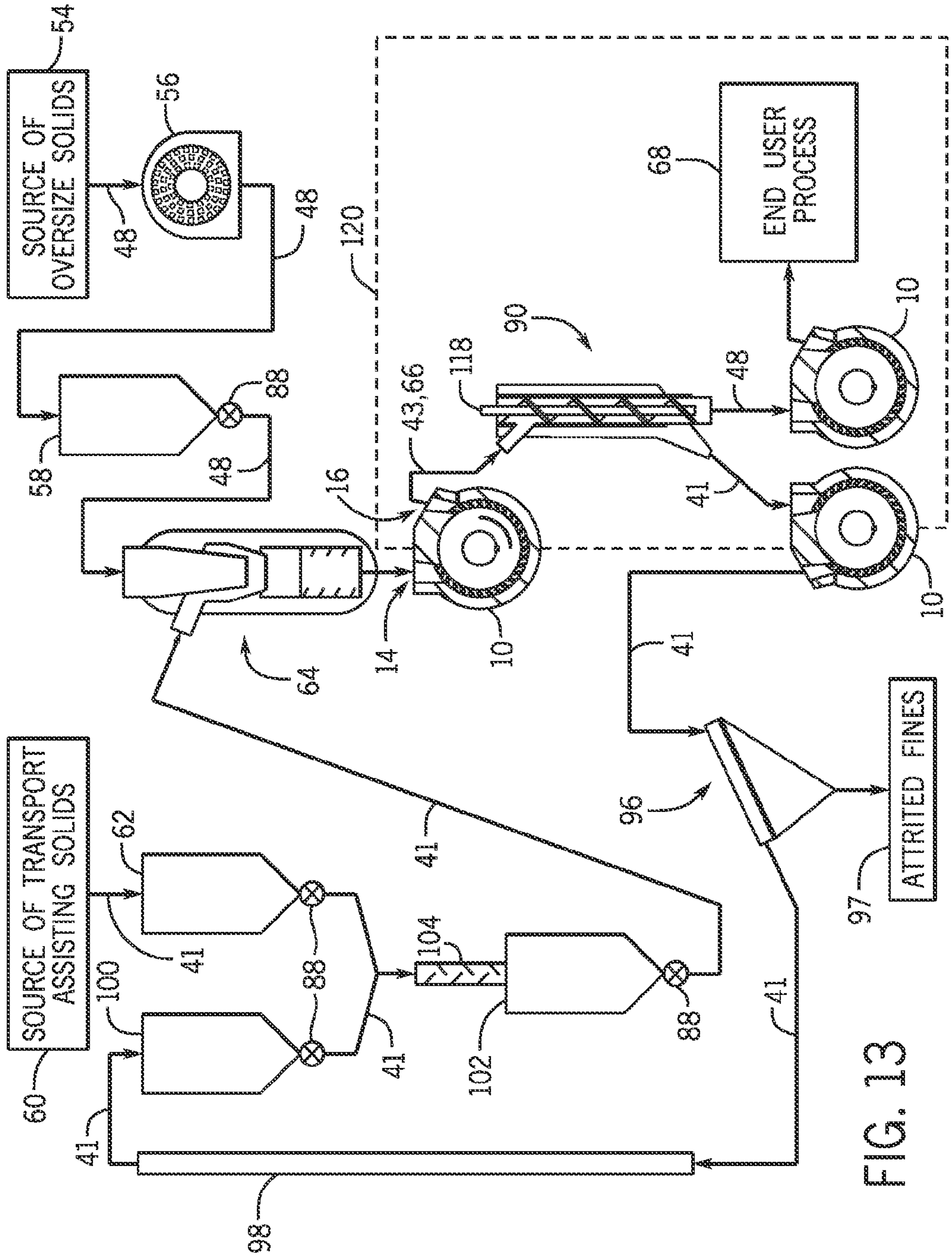
FIG. 13 is a schematic diagram of an embodiment of the system shown in FIG. 9.

FIG. 13 illustrates an embodiment for the process shown in FIG. 9. As in the first embodiment, a source 54 of oversize solid feed 48, such as wood or oversize biomass, is reduced, if needed, to a size that will not get stuck in the solids pump 10. The sized solid feed 48 is stored in a sized chunk solids bin or hopper 58 with a rotating star valve 88 or similar device at the bottom that meters the solid feed 48 into the solids packing device 64. Mixed transport assisting solids 41 from the transport assisting solids mixing and solids bin 102 are also metered into the solids packing device 64 via a rotating star valve 88 or similar device at the bottom of that bin 102. The rotating star valves 88 are controlled in such a way as to meter the sized solid feed 48 and the assisting solids 41 into the solids packing device 64 in the correct mass flow ratio. The solids packing device 64 mixes and packs the solid feed 48 with the assisting solids 41 and feeds the combination 66 (e.g., solids mixture 43) to the inlet channel 14 of a solids pump 10. The solids pump 10 pressurizes the mixed and packed combination 66 to the pressure used within the end user process 68. The illustrated embodiment in FIG. 13 may be used when the end user process 68 does not accept the assisting solids 41 that were pressurized along with the solid feed 48. Therefore, a separating device 90, such as one or more of the embodiments shown in FIGS. 10-12, is deployed downstream of the solids pump 10.

As illustrated in FIG. 13, the vertical rotating screw conveyor 118 may be used to separate the assisting solids 41 from the solid feed 48. Also as illustrated, the process of separation by the separating device 90 may occur completely within the pressurized zone 120 (e.g., the section of the in which processes are at a higher pressure than the sections outside the pressurized zone 120). As the pressurized combination 66 from the solids pump 10 passes through the vertical rotating screw conveyor 118, the assisting solids 41 pass through the screen and are collected in the outer barrel while the solid feed 48 is delivered by the screw to the inlet of a second solids pump 10 which may perform the final metering of the solid feed 48 into the end user process 68. In certain embodiments, the second solids pump 10 has a high pressure body, but it does little or no additional pressurization of the solid feed 48. Therefore, the second solids pump 10 may be the same type of solids pump, or may be a different type of solids pump 10. The second solids pump 10 may also be configured as just a metering device.

The assisting solids 41 which were separated from the solid feed 48 enter a third solids pump 10 which operates in depressurization mode to reduce the pressure of the assisting solids 41 back to atmospheric pressure or another low pressure. The third solids pump 10 may also be the same type as either the first or the second solids pump 10, or the third solids pump 10 may be different than either of the other solids pumps 10. The depressurized assisting solids 41 are then screened in the transport assisting solids attrited fines removal unit 96 to remove the very finest attrited particles 97 of the assisting solids 41. The overflow from the attrited fines removal unit 96 is transported via a recycle system 98 such as a conveyor belt, a screw conveyor or a pneumatic conveying system to an assisting solids recycle storage bin or hopper 100. Fresh assisting solids 41 are also loaded into a fresh assisting solids storage bin or hopper 62. Both of these bins or hoppers (e.g., fresh assisting solids storage bin 62 and assisting solids recycle storage bin 100) are fitted on the bottom with rotating star valves 88 or similar devices that meter the fresh assisting solids 41 and the recycle assisting solids 41 into a transport assisting solids mixing and storage bin or hopper 102 via mixing column 104. The assisting solids mixing column 104 contains an open structure of internal baffles that mixes the two assisting solids 41 streams at the ratio of mass flow rates controlled by the star valves 88 as the two streams fall by gravity through the baffle structure within the mixing column 104 and into the transport assisting solids mixing and storage bin 102.

One or more of the illustrated pieces of equipment may be added, substituted, or subtracted within the scope of the embodiment shown in the block flow diagram of FIG. 9. For example, if the oversize solids 48 are already available at a size that is unlikely to jam in the solids pump 10, the grinder 56 may be eliminated. Although the second solids pump 10 is shown as discharging directly into the downstream end user process 68, the second pump 10 may alternatively discharge to a screw conveyor, a pneumatic conveying system, a chute or another process or device that does the final feeding to the end user process 68. In an alternative embodiment, the second solids pump may be replaced by a screw conveyor, a pneumatic conveying system, a chute or another device that does the final feeding directly from the discharge of the solids separator 90 into the end user process 68. In certain embodiments, the vertical screw conveyor screen separating device 118 may be replaced or supplemented with one of the other solids separating devices 90, the third solids pump 10 may be replaced by a lock hopper system, and/or the attrited fines screen 96 and the transport assisting solids mixing column 104 may be replaced by alternative devices that perform the same or similar functions.

FIG. 13 may also be used to represent a possible equipment configuration for a third process embodiment that is also consistent with the block flow diagram shown in FIG. 9. The first process embodiment, shown in FIG. 8, may be a once-through system in which the transport assisting solids 41 pass through the system just once and then are fed into the downstream end user process 68 along with the sized chunk solids 48. Such a process may be useful when the transport assisting solids can be tolerated by the end user process or when they can be fashioned from a material that is a desired participant in the further processing of the sized chunk solids 48 in the end user process 68. The second process embodiment, shown in FIG. 11, is a recycle system in which all of the transport assisting solids 41 are separated from the sized chunk solids 48 downstream of the solids pump so that the transport assisting solids 41 can be recycled to the front end of the system for reuse. Such a process may be useful if the end user process 68 cannot tolerate the presence of the finely divided transport assisting solids, if the transport assisting solids 41 are expensive and must be conserved or if it is desirable to minimize the energy to produce the finely divided transport assisting solids 41. The third process embodiment, which may also be represented by the equipment in FIG. 13, is a hybrid of the first and second embodiments. A difference is that the efficiency of the solids separating device 90 downstream of the solids pump 10 is reduced so that some of the transport assisting solids 41 are separated for recycle while the rest remain with the sized chunk solids and are fed into the downstream end user process 68. Such a process may be useful when the transport assisting solids can be fashioned from a material that is a desired participant in the further processing of the sized chunk solids 48 in the end user process, but not in the quantity that is required to achieve the desired level of packing to sustain the pressure drop across the solids pump 10. An example might be a high pressure metals refining process in which a small amount of non-metallic fluxant is desirable. If the non-metallic fluxant is also a suitable material for use as the transport assisting solids 41, the efficiency of the solids separating device 90 can be tailored to allow just enough of it to pass through with the chunk solids 48 so that any fluxant used by the downstream end user process 68 is sufficiently provided.

Technical effects of the disclosed embodiments include a solid feed pump that has a channel configured to move solids from a low pressure condition to a higher pressure condition, or from a high pressure condition to a low pressure condition. In order to smoothly and consistently maintain the pressure differential, the system also includes a solids packing device coupled to the solid feed pump. The solids packing device receives chunk solids 48 with a narrow range of chunk sizes, and also receives transport assisting particles 41 with a second range of sizes. The first range of sizes may be bigger than the second range of sizes, but the first range of sizes does not allow the chunk solids to pack tightly enough to maintain the pressure differential between the high pressure condition and the low pressure condition. An additional channel is configured to receive and mix the solid feed 48 and the transport assisting particles 41 to provide a solid feed 48/transport assisting particles 41 mixture with the transport assisting particles 41 filling interspatial spaces 52 between the solid feed 48.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
- a solids packing device comprising:
  - a first channel configured to receive a solid feed with a first range of sizes;
  - a second channel configured to receive solid transport assistance particles (TAP) with a second range of sizes, wherein the first range of sizes is different from the second range of sizes;
  - a third channel located downstream of the first and second channels and configured to separately receive and then mix the solid feed and the solid TAP to provide a solid feed-solid TAP mixture with the solid TAP filling interspatial spaces between the solid feed, wherein the first channel and the second channel are oriented to provide the solid feed and the solid TAP, respectively, in a same direction of a flow of the solid feed-solid TAP mixture thru the third channel;
  - a first nozzle having a first wall defining the first channel; and
  - a second nozzle having a second wall, wherein a first pportion of the first wall is disposed within the second wall in a concentric arrangement to define the second channel between the first and second walls, and a second portion of the second wall located downstream of the second nozzle defines the third channel; and
- a solid feed pump, comprising:
  - a housing;
  - a passage disposed within the housing;
  - a solid feed inlet configured to receive the solid feed-solid TAP mixture from the third channel and provide the solid feed-solid TAP mixture to the passage;
  - a solid feed outlet coupled to the passage; and
- at least one disk configured to move the solid fee-solid TAP mixture from the solid feed inlet to the solid feed outlet.

2. The system of claim 1, wherein a second portion of the second channel is circumferentially disposed about a first portion of the first channel.

3. The system of claim 1, wherein the solid feed-solid TAP mixture is configured to enter the solid feed inlet at a first pressure and to exit the solid feed outlet at a second pressure, the second pressure is higher than the first pressure, and the solid feed-solid TAP mixture is configured to block a flow of a gas between the solid feed outlet and the solid feed inlet to enable a pressure gradient across the passage between the solid feed inlet and the solid feed outlet.

4. The system of claim 2, wherein the solids packing device comprises a first vibrator disposed on an external surface of the solids packing device, a second vibrator disposed within the solids packing device in a flow path of the solid feed-solid TAP mixture, an external worm gear drive configured to rotate internal spiral flutes within the third channel, or any combination thereof, wherein the first or second vibrator is configured to facilitate packing of the solid feed and the solid TAP.

5. The system of claim 1, wherein the first nozzle and the second nozzle are vertically aligned with respect to each other.

6. A system, comprising:
- a solids packing device comprising:
  - a first channel configured to receive a solid feed with a first range of sizes;
  - a second channel configured to receive transport assistance particles (TAP) with a second range of sizes, wherein the first range of sizes is different from the second range of sizes;
  - a third channel configured to receive and mix the solid feed and the TAP to provide a solid feed-TAP mixture with the TAP filling interspatial spaces between the solid feed; and
  - a first vibrator disposed on an external surface of the solids packing device, a second vibrator disposed within the solids packing device in a flow path of the solid feed-TAP mixture, an external worm gear drive configured to rotate internal spiral flutes within the third channel, or any combination thereof, wherein the first or second vibrator is configured to facilitate packing of the solid feed and the TAP; and
- a solid feed pump, comprising:
  - a housing;
  - a passage disposed within the housing;
  - a solid feed inlet configured to receive the solid feed-TAP mixture from the third channel and provide the solid feed-TAP mixture to the passage;
- a solid feed outlet coupled to the passage; and
- at least one disk configured to move the solid fee-solid TAP mixture from the solid feed inlet to the solid feed outlet.

* * * * *